United States Patent [19]

Katz et al.

[11] Patent Number: 5,026,465
[45] Date of Patent: Jun. 25, 1991

[54] ELECTRODEIONIZATION POLARITY REVERSAL APPARATUS AND PROCESS

[75] Inventors: William E. Katz, Weston; Irving D. Elyanow, Somerville; Keith J. Sims, Framingham, all of Mass.

[73] Assignee: Ionics, Incorporated, Watertown, Mass.

[21] Appl. No.: 389,850

[22] Filed: Aug. 3, 1989

[51] Int. Cl.$^5$ .............................................. B01D 13/02
[52] U.S. Cl. ................................ 204/182.4; 204/301; 204/151
[58] Field of Search ...................... 204/182.4, 151, 301

[56] References Cited

U.S. PATENT DOCUMENTS

| | | | |
|---|---|---|---|
| 2,788,319 | 3/1957 | Pearson | 204/151 |
| 2,815,320 | 12/1957 | Kollsman | 204/301 |
| 3,043,768 | 7/1962 | Olie et al. | 204/151 |
| 3,330,750 | 7/1967 | McRae et al. | 204/301 |
| 4,956,071 | 9/1990 | Giuffrida et al. | 204/182.4 |

Primary Examiner—John F. Niebling
Assistant Examiner—Arun S. Phasge
Attorney, Agent, or Firm—Norman E. Saliba

[57] ABSTRACT

An electrodeionization polarity reversal apparatus is employed for the removal of dissolved salts from liquids. The preferred embodiment comprises the use of a fluid permeable filler of an equinormal mixture of anion and cation exchange material in both the ion-depleting and ion-concentration chambers while employing periodic symmetrical polarity reversal.

12 Claims, 1 Drawing Sheet

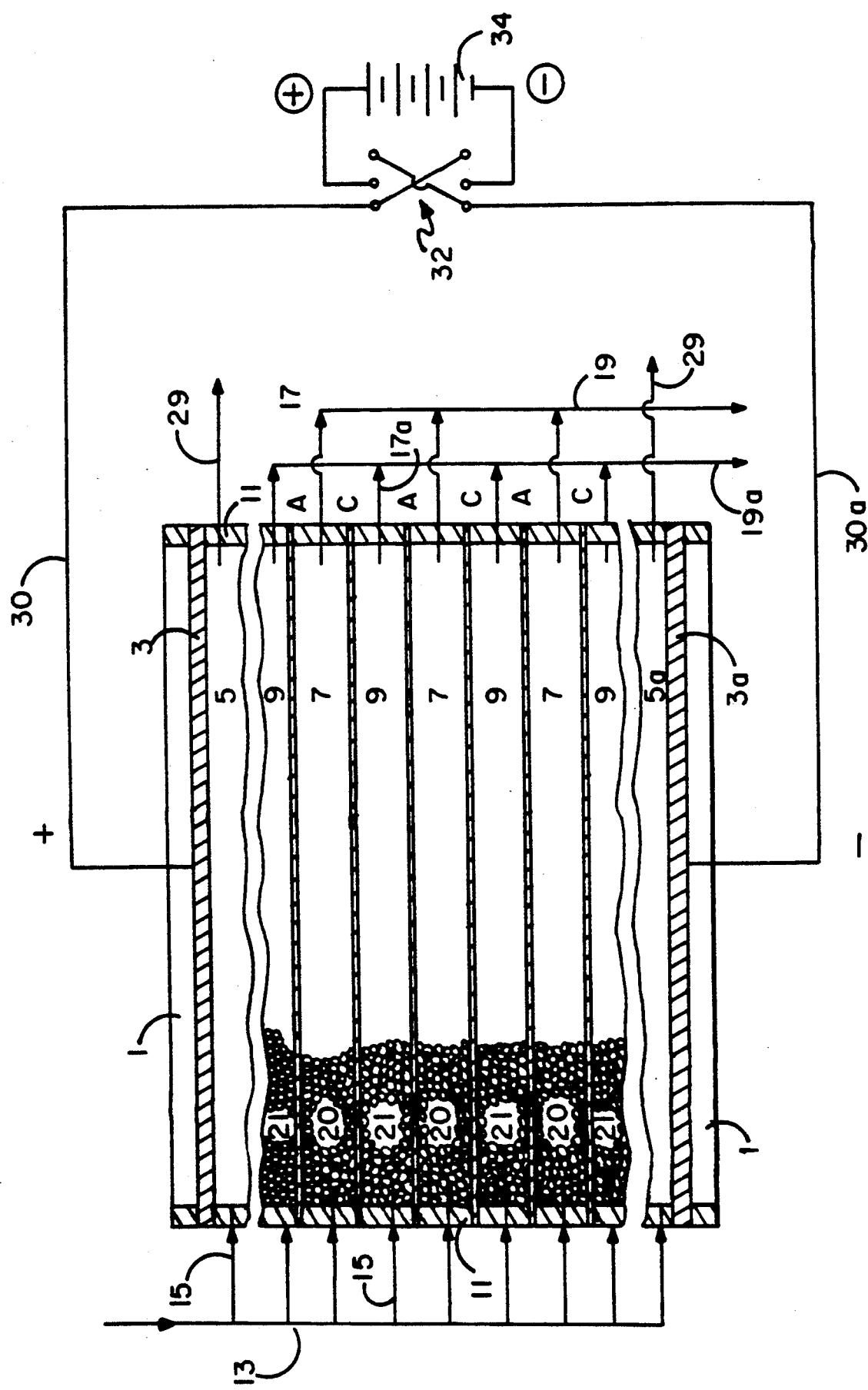

ELECTRODEIONIZATION POLARITY REVERSAL APPARATUS AND PROCESS

BACKGROUND OF THE INVENTION

1. Field of the Invention

This invention relates in its broadest aspects to the apparatus and processes for the removal of dissolved salts from liquids by electrodeionization (EDI). In a narrower aspect, the invention relates to an improved electrodeionization process, to wit: the electrodeionization reversal process where the periodic reversal of the electrical polarity is employed.

2. Description of the Prior Art

The electrodeionization apparatus consists of an electric membrane demineralizer with its stack of alternating ion-selective membranes and ion-depleting and ion-enriching compartments in which at least the ion-depleting compartments are filled with ion exchange beads. The EDI process is useful in general to treat waters or gases containing ionizable contaminants, for example to produce ultrapure water, or to remove carbon dioxide from air. The use of electrodeionization (EDI) is disclosed in U.S. Pat. Nos. 2,815,320 (Kollsman), 3,149,061 (Parsi), 3,291,713 (Parsi), 3,330,750 (McRae et.al.), and many others.

EDI for the deionization of water requires extensive pretreatment of the feed water to remove ions which tend to cause precipitates to form in the chambers of the EDI stack, and to remove organic and other contaminants which would tend to collect on the membranes and on the resin, and cause the performance of the EDI stack to suffer. In particular the feed water to an EDI stack requires softening and organic scavenging.

One type of scaling is caused by precipitation of certain sparsely soluble salts, for example calcium carbonate or calcium sulfate, when their solubility is exceeded in the EDI apparatus. Calcium carbonate may form a scale at the cathode, where the electrolysis of water results in the generation of base and hydrogen gas. The base can react with bicarbonate to form carbonate, which in turn can form insoluble calcium carbonate or magnesium basic carbonate. Most natural waters contain calcium and magnesium ions. Other basic precipitates may also form. A similar effect can result from "splitting" of water at the ion-exchange membrane, ion exchange bead, and water interfaces, a phenomenon commonly known as polarization, which results in pH changes that can lead to precipitation within the stack. All of these forms of precipitates are commonly referred to as scale. Build-up of scale can result in an increase in the resistance to the flows of electricity and water through the stack. Also, physical damage can be inflicted on stack components by severe scaling.

Deposition of colloids, organic contaminants, and othher impurities on the surface of the membranes and ion-exchange beads generally results in an increase in electrical resistance; this may also result in an increase in the hydraulic resistance in the compartments of the stack and in a decrease in current efficiency. Some of these organic materials may also be absorbed in the ion-exchange membranes and/or beads as well, leading to a decrease in the overall performance of the stack.

SUMMARY OF THE INVENTION

The improvement brought about by the present invention is a reduction in scaling and fouling tendencies by salt precipitates, colloids, organic contaminants and other impurities which are present in natural waters, by periodically and symmetrically reversing the electical polarity of the direct current flow through the stack. The polarity may be reversed at intervals preferably of at least 1 hour and up to 24 hours, depending on the severity of the scaling and fouling tendencies of the feed water. When the polarity is reversed, the ion-depleting compartments become ion-enriching compartments and vice versa, therefore it is necessary to simultaneously interchange the flows of the ion-depleting and enriching compartments by suitable manual or automatic manipulation of flow combining and diversion valves. In the usual electrodialysis processes where reversal of current is employed between a plurality of staged stacks, it has been found advantageous to time the flow diversion and the time of current reversal in an optimal manner that results in a minimum of mixing of product water and wastewater flow in the stacks and stack piping at the time of current reversal. This system is fully disclosed in U.S. Pat. Nos. 4,381,232 (Brown). Other U.S. Pat. Nos. disclosing the use of polarity reversal in electrodialysis processes are U.S. Pat. Nos. 2,863,813 (Juda et. al.), 3,341,441 (Giuffrida et.al), 4,115,225 (Parsi), and 4,461,691 (Jain). However, none of the patents disclose or suggest the use of current reversal in conjunction with a filled chamber-electrodeionization unit.

One particular advantage of the present invention is that slow, large or complex ions which do not traverse the ion-exchange membranes in one polarity cycle, are essentially absorbed or adsorbed on the ion-depleting side of the membranes. This would be particularly true of organics and silica, with the net result that better removals of these species may be obtained using EDIR than EDI, because in the latter the ionic species must traverse the thickness of the membrane, whereas in EDIR these ions would be desorbed into the ion-enriching compartments upon reversal of polarity. This phenomenon was pointed out, with reference to electrodialysis reversal (EDR) by W. E. Katz and F. G. Clay, "TOC Removal from Surface Waters by Commercially Operating Triple Membrane Demineralizers", and the "Prepared Discussion" by T. A. Davis, Proceedings of the 49th International Water Conference, Pittsburgh, PA, Oct. 24–26, 1988.

BRIEF DESCRIPTION OF THE DRAWING

The FIG. is a schematic vertical section of an electrodeionization apparatus comprising the invention.

DESCRIPTION OF THE PREFERRED EMBODIMENT

Referring now to the drawing, there is shown a multicell electrodeionization reversal (EDIR) unit for which the present invention may be advantageously applied. It will be apparent that electrodeionization reversal (EDIR) systems and structures other than those shown can advantageously employ the present invention. It is to be understood that the configuration of membranes, ion-exchange filler material and chambers that can be arranged between electrode containing chambers may be modified in various respects without departure from the principles of the invention. The drawing illustrates apparatus containing conduits for passing solution into and out of the unit in various directions and employing the principle of periodic reversal of the direction of the direct current. The unit illustrated, comprises insulated end plates or walls 1 and electrodes 3 and 3a; the electrodes being disposed in electrode chambers or compartments 5 and 5a. Ion selective membranes of cations C and anions A are alternately placed between the electrode chambers and are selectively permeable to the passage of positive and negative ions, respectively. The membranes subdivide the space between the electrode chambers into adjoining chambers 7 and 9; the membranes being separated from each other by gasketing spacer members 11. The manufacture and properties of cation-permselective membranes is disclosed in U.S. Pat. Nos. 2,702,272, 2,730,768, 2,731,408, 2,731,411 and many others; similarly, for anion-permselective membranes in U.S. Pat. Nos. 2,730,768, 2,800,445, 2,860,097 and many others. The ion-diluting chambers and ion-concentrating chambers contain therein a fluid permeable filler or bed 20 and 21 of granular, spherical or fibrous shapes of ion-exchangers, preferably an intimate mixture of both strong anion and cation exchangers which are available commercially. IRA400, IRA900 and IRA458 are trade names for anion exchangers incorporating a quaternary ammonium type of structure. IR120 and IRC200 are examples of cation exchangers comprising a sulfonated copolymer of styrene and divinyl benzene (Rohm & Haas Co.). In the embodiment shown, the polarity of the direct current is such that the electrode located on the top side of the drawing is anodic or positive, and the electrode located at the bottom is the cathode or negative electrode, there is thus defined therebetween a plurality of intermediate chambers comprised of ion-depleting (ion-desalting or diluting) chambers 7 and ion-enriching or concentrating chambers 9. Means for supplying a liquid to the chambers are provided for by a common manifold inlet 13 which divides into conduits 15 for separately feeding each chamber. The solution to be treated may be passed into the electrodeionization reversal (EDIR) unit continuously or batch-wise, in series, or in parallel flow, or in various other ways which are well known in the art. Where the feed solution to the chambers 7 and 9 are dissimilar in salt concentration or of different liquids, it is necessary that a separate manifold inlet connect each set of alternate compartments so that one set of compartments 7 be fed from a first manifold and the other set 9 by a second manifold. In such a system employing separate manifold inlets, it is necessary that on reversal of current the separate and different solution streams be interchanged by stream reversal means such as for example a hydraulic reversal valve (not shown). These valves are employed to divert the diluting feed stream from one set of chambers to the alternate set during the two half cycles and simultaneously divert the concentrating feed stream in the exact opposite manner. Similarly, combining valves direct the diluting and concentrating effluents to the desired downstream locations. In both cycles, the flow to the electrode chambers is also reversed if required so that the former anode (presently the cathode) is now being flushed with a stream of electrolyte solution and the former cathode (presently the anode) may have another liquid flow therethrough.

As the solution passes through the chambers of the electrodeionization reversal (EDIR) unit, the ions present in the diluting chambers 7 are removed therefrom by adsorbtion and ion-transfer and the resulting purified or dilute stream is discharged via conduits 17 into a common discharge manifold 19. The outlet pipe 29 is employed for the removal of liquid and gas from the electrode chambers 5 and 5a. Similarly, the solution supplied to the second set of chambers 9, which in the case illustrated would be the ion-concentrating chambers, will pick up ions that have migrated therein from the diluting chambers 7. This concentrated salt solution is discharged from the concentrating chamber via conduits 17a into a common discharge manifold 19a. Solenoid valves are electrically connected and phased with the polarity reversal switch 32 (said valves and connections not being illustrated in the drawing) and allows the solution passing out from each set of chambers to be collected, or, in the alternate, to be directed for example into other chambers. Leads 30 and 30a connect the electrodes with a polarity reversal switch 32 and a source of direct current 34. To prevent confusion, the drawing has not been illustrated with the usual pumps, flowrators and valves which are understood in the art to be employed in conjunction with electrodialysis reversal (EDR) units, and which likewise would be applicable to EDIR.

The invention can also be advantageously employed in electrodeionization reversal (EDIR) units which have been modified in design. One such modification is "internal staging" whereby the effluent solution of one set of diluting and concentrating chambers is passed as the influent feed to a subsequent set of diluting and concentrating chambers that are located within the same electrodeionization reversal (EDIR) unit and between one pair of electrodes. Such a set of diluting and concentrating chambers is termed a "hydraulic" stage and the apparatus can combine a plurality of stages between two end electrodes. Another variation is to insert a pair of electrodes intermediate between two of said stages, which electrodes are connected in common and hydraulically fed from a flow distribution block placed therebetween, such that current will flow in opposite directions through the adjoining electrical stages between the end electrode of one charge and the intermediate electrodes of opposite charge. More than one hydraulic or electrical stages or combinations thereof may be used within one stack.

The operation of the electrodeionization reversal unit of the drawing may be illustrated from the following examples:

EXAMPLE 1

Two electrodeionization (EDI) units or stacks of the design shown in the drawing comprising four cell pairs in each stack was used to treat Watertown, Mass. tap water. (A cell pair consists of one ion-depleting and one ion-concentrating chamber). One electrodeionization unit which operates in conjunction with current polarity reversing means will be known hereinafter as an electrodeionization reversal (EDIR) unit. Both units were otherwise identical, i.e. the electrodes were made of platinized titanium, alternating cation and anion selective membranes (manufactured by Ionics, Incorporated) were employed in the stack and an equinormal mixture of ion-exchange resin beads cation IR120 and anion IRA458 (Rohm & Haas Co.) were used to fill both the ion-depleting and ion-concentrating chambers.

The tap warer used had a high organic loading in order to demonstrate the relative performance of EDI and EDIR stacks under potentially fouling conditions. The tap water feed to both stacks was ultrafiltered to a 15-minute silt density index of approximately 1. Each stack was fed so that it produced 114 ml/min of desalted product water effluent in addition to salt concentrate and electrode stream effluents. The feed tap water conductivity was 62 microSiemens/cm ($\mu$s/cm) (corresponding to about 29 parts per million (ppm) of dissolved ionized salts) 8 hours after startup, while the product conductivity was in the 1.1 to 2.5 S/cm range (resistivity of 0.4 to 0.9 megohm-cm range). At this time the EDI unit was operating at 10.5 volts and 66 milliamperes (mA), while the EDIR unit was operating at 10.0 volts and 68 mA. The electrical polarity of the EDIR unit was reversed every hour. Measurements were made near the end of the hour just before the change in polarity.

After 478 hours of operation, the EDI unit recorded 12.6 volts and 44 mA, while the EDIR unit was 10.9 volts and 64 mA. The stack pressure drops and product flow rates were stable during this period. At the end of this period, the product resistivity of both units was in the 1 to 2 megohm-cm range (0.5 to 1 S/cm), while the water inlet conductivity was 82 µs/cm. Neither currents or voltages were adjusted during the operating period.

The stack's electrical resistance was calculated by subtracting the electrode voltage (5 volts) from the total voltage and dividing by the current. Thus the resistance of the EDI unit after 8 hours of operation was 83 ohms, while that of the EDIR unit was 74 ohms.

After 478 hours of operation, the resistance of the EDI unit was 173 ohms (a 108% increase), while that of the EDIR unit was 92 ohms (a 24% increase). Thus the electrical resistance of the EDI unit increased more than that of the EDIR unit and hence illustrates the use of polarity reversal to minimize the effects of fouling. Excessive electrical resistance in a stack will result in reduced unit capacity and/or increased electrical power costs.

EXAMPLE 2

Two EDI units or stacks similar to those used in Example 1 were used to treat a well water containing 350 parts per million (ppm) total dissolved solids (TDS), including 210 ppm hardness and 100 ppm bicarbonate, the latter two expressed as calcium carbonate. At its pH of 7.8, this water has a tendency to form basic scale during electrodeionization. As in the previous example, one of the units was operated in a non-reversal or EDI mode, while the other unit was operated with the electrical current reversed periodically and symmetrically, that is, in an EDIR mode.

The well water flowed through a 5 µ particle filter before entering the stacks. The 15-minute slit density index was 6.3. Thus the feed to the stacks had tendencies to both scaling and fouling. The feed conductivity was about 500 µS/cm throughout the operation described below. Pressure drops and product flow rates remained stable.

After the first 6 hours of operation, the EDI unit had a 2.5 µS/cm product at a rate of 132 ml/min. Voltage of the stack was 26 volts and current was 0.46 amps. The EDIR unit afrer the same period of operation had an 8 µS/cm product at a rare of 144 ml/min. Voltage was 26 volts and current was 0.50 amps.

After an additional 21 hours of operation, the EDI unit was at 27 volts and 0.14 amps, while the EDIR unit was at 27 volts and 0.44 amps. Thus the electrical resistance of the EDI unit rose from 46 to 157 ohms (240% increase), while that of the EDIR rose from 44 to 50 ohms (19% increase).

The EDI product conductivity rose to 257 µS/cm (over 100 times the 6-hour value), while the EDIR product conductivity merely rose from 43 to 46 ohms.

At this time the stacks were examined and the EDI stack was found to contain calcium carbonate precipitate in the flow path of the resin-filled cells and in the cathode compartment, whereas the EDIR stack was found to be free of such scale.

This example illustrates the use of polarity reversal to minimize the effects of scaling and fouling feed waters. In this case, not only would such an increase in electrical resistance result in reduced unit capacity and/or increased electrical power costs, but product quality, as measured by conductivity, was not maintained.

While we have shown and described herein certain embodiments of our invention, we intend to cover as well any change or modification therein which may be made without departing from its spirit and scope.

We claim:

1. In the method of substantially preventing fouling of ion-exchange membranes and ion-exchange filler, and preventing scale formation in the chambers of an electrodeionization apparatus during the electrical transfer of ions from one electrolyte solution to another, comprising the steps of passing a first electrolyte solution through the ion-depleting chambers of said apparatus having a plurality of alternating ion-depleting and ion-concentrating chambers, said chambers being defined between alternating anion and cation perm-selective membranes, the said ion-depleting and ion-concentrating chambers containing a fluid-permeable filler of ion-exchange material, passing a second solution through the ion-concentrating chambers of said apparatus, passing a third and fourth solutions through the electrode chambers, passing a direct current transversely across the chambers, periodically reversing the polarity of the said direct current and simultaneously therewith interchanging the first and second solutions between their respective chambers.

2. The process of claim 1 wherein said ion-depleting and ion-concentrating chambers contain substantially the same fluid-permeable filler of ion-exchange material.

3. The process of claim 1 wherein the fluid permeable filler of ion-exchange material comprises an equinormal mixture of both anion and cation exchange material.

4. The process of claim 1 wherein the polarity of said current is reversed at substantially equal intervals.

5. The process of claim 1 wherein the fluid-permeable filler comprises a mixture of strongly basic anion exchange and strongly acid cation exchange material.

6. The method of claim 1 wherein the third and fourth solutions are also simultaneously interchanged between their respective chambers.

7. An electrodeionization apparatus comprising in combination a plurality of chambers, the two end chambers comprising the electrode chambers, one chamber having disposed therein a negative electrode, the other a positive electrode, a plurality of alternating ion-depleting and ion-concentrating chambers defined by alternatingly arranged anion and cation exchange membranes, said ion-depleting and ion-concentrating chambers containing a fluid-permeable filler mixture of anion and cation exchange material; inlet means for introducing a first solution to be treated into the filled ion-depleting chambers and outlet means for a withdrawal of the liquid from said chambers, inlet means for passing a second, third and fourth solutions into the ion-depleting and electrode chambers respectively, and outlet means for withdrawal of liquid from said chambers, means for passing a direct current transversely across the membranes, ion-exchanged filler material and chambers, means for periodically reversing the polarity of said current and further means therewith for simultaneously interchanging the first and second solutions, between their respective chambers.

8. The apparatus of claim 7 wherein said ion-depleting and ion-concentrating chambers contain substantially the same fluid-permeable filler of ion-exchange material.

9. The apparatus of claim 7 wherein the fluid-permeable filler of ion-exchange material comprises and equi-normal mixture of both anion and cation exchange material.

10. The apparatus of claim 7 containing means whereby the polarity of said current is reversed at substantially equal time intervals.

11. The apparatus of claim 7 wherein the fluid-permeable filler comprises a mixture of strongly basic anion exchange and strongly acid cation exchange material.

12. The apparatus of claim 7 wherein means are also provided for simultaneously interchanging the third and fourth solutions between their respective chambers.

* * * * *

UNITED STATES PATENT AND TRADEMARK OFFICE
CERTIFICATE OF CORRECTION

PATENT NO. : 5,026,465
DATED : June 25, 1991
INVENTOR(S) : William E. Katz et.al.

It is certified that error appears in the above-identified patent and that said Letters Patent is hereby corrected as shown below:

Column 6, Claim 7, line 65: change "solutions" to --solution-- and also change "depleting" to --concentrating--;

Column 7, Claim 7, line 1: change "exchanged" to --exchange--;

Column 7, Claim 9, line 12: change "and" to --an--.

Signed and Sealed this

Twelfth Day of January, 1993

Attest:

DOUGLAS B. COMER

*Attesting Officer*  *Acting Commissioner of Patents and Trademarks*